Oct. 1, 1929.  A. H. EDGERTON  1,729,932
BRAKE MECHANISM
Filed Feb. 14, 1925   2 Sheets-Sheet 1
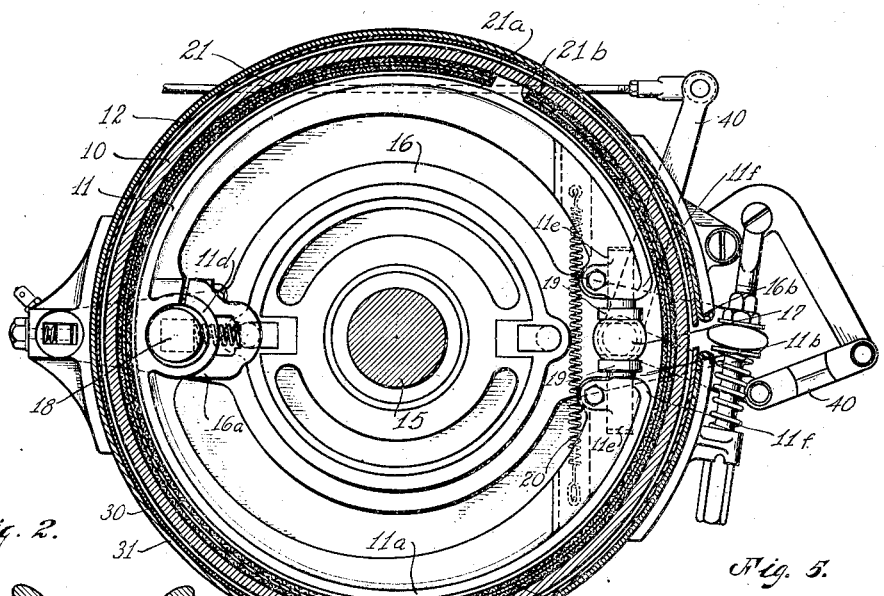
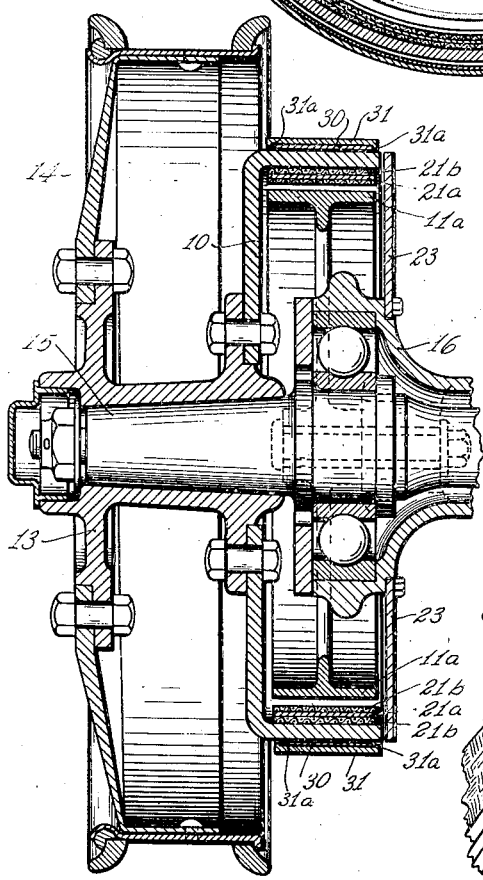
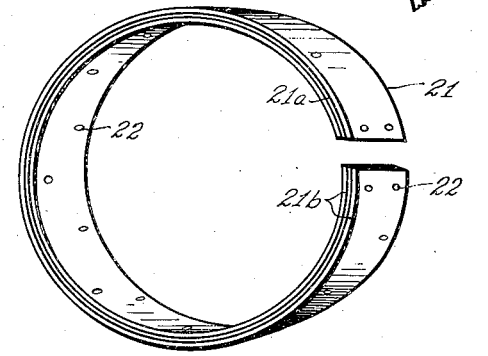
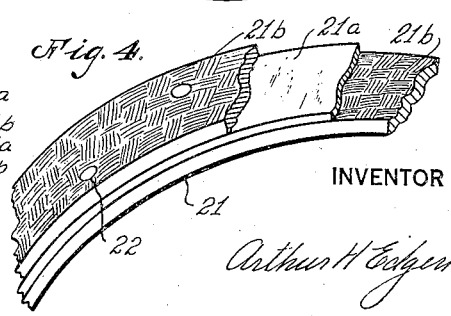
INVENTOR
Arthur H Edgerton

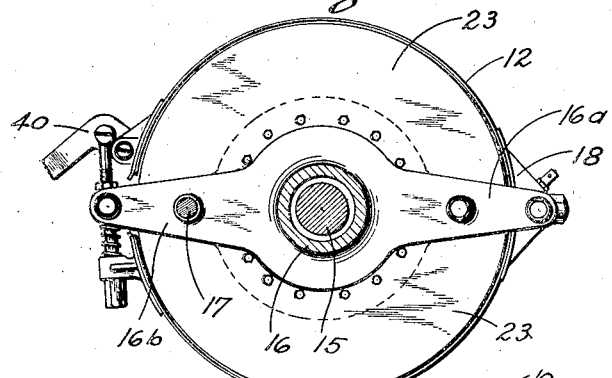
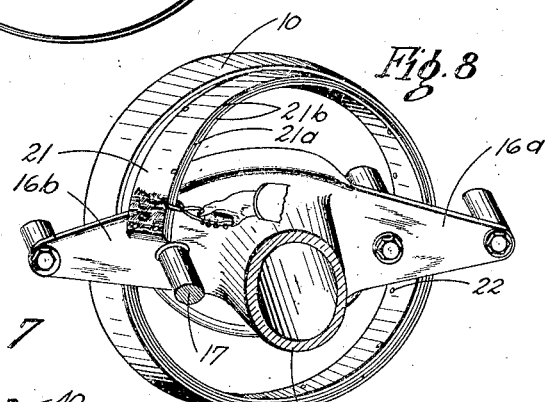
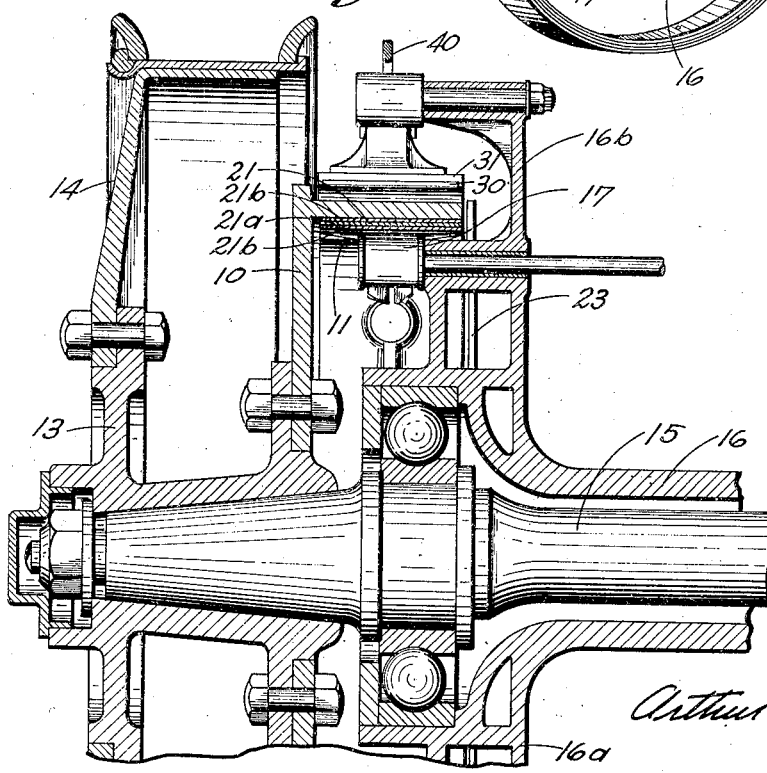

Patented Oct. 1, 1929

1,729,932

UNITED STATES PATENT OFFICE

ARTHUR H. EDGERTON, OF LAKEWOOD, OHIO, ASSIGNOR TO THE WHITE MOTOR COMPANY, OF CLEVELAND, OHIO, A CORPORATION OF OHIO

BRAKE MECHANISM.

Application filed February 14, 1925. Serial No. 9,225.

My invention relates to improvements in brake mechanisms and more particularly to brake mechanisms such as are commonly employed in motor vehicles or for analogous purposes.

An object of my invention is to provide an improved brake mechanism so constructed as to permit the ready replacement of the wearing friction means incorporated therein.

Another object of my invention is to permit the ready replacement of the friction wearing means without requiring the use of special tools or equipment.

Another object of my invention is to provide an improved braking mechanism employing a removable friction wearing strip of simple and inexpensive construction and which may be carried by the automobile owner for replacement purposes.

Another object of my invention is to provide a brake mechanism wherein the friction braking surface area is relatively large.

Another object of my invention is to provide as an article of manufacture a removable wear piece for braking mechanisms of automotive vehicles.

With the above and other objects in view, the nature of which will more fully appear as the description proceeds, my invention consists in the novel construction and arrangment of parts as are herein fully described, illustrated, and claimed.

In the accompanying drawing, in which I have shown one form of my invention—

Fig. 1 is a view partly in elevation and partly in vertical section showing so much of the brake operating mechanism as is necessary for an understanding thereof.

Fig. 2 is a vertical section through a vehicle wheel and the braking mechanism of the type illustrated in Fig. 1.

Fig. 3 is a perspective view of the friction element embodied in my invention.

Fig. 4 is a perspective view of a fragmentary portion of the friction element showing the construction thereof.

Fig. 5 is a perspective view of a fragmentary portion of a brake drum and brake retaining plate.

Figure 6 is a sectional view illustrating the arrangement and formation of the arms which support the brake actuating mechanism.

Figure 7 is a horizontal sectional view illustrating the brake actuating mechanism supports.

Figure 8 is a view in perspective illustrating somewhat diagrammatically the manner in which one of the braking elements may be withdrawn from the assemblage.

The brake chosen to illustrate the invention is of a type which may be employed on motor vehicles, and comprises a brake drum 10, an internal brake shoe 11 of the expanding type, and an external contracting brake 12. The brake drum 10 is secured to the hub 13 of a wheel 14, mounted on an axle shaft 15 which is journaled in the axle housing 16. The outer ends of this axle housing have laterally depending brackets or arms $16^a$, provided to support the expanding and contracting members of the brake, and the arm $16^b$ to support the brake controlling mechanism.

In the embodiment of my invention illustrated, I show an internal brake shoe 11, an outwardly flexible annular band $11^a$, the continuity of which is broken at $11^b$, to accommodate an intervening brake actuating cam 17.

The inner face of the brake shoe 11 is provided with a bearing-boss $11^d$ diametrically opposite the brake cam 17, and is adapted to yieldingly support the brake shoe on an anchor pin 18 rigidly secured to the bracket $16^a$. At each end of the brake shoe there are bosses $11^e$ formed with aligned apertures adapted to adjustably support the shanks of hardened metal wear plates 19. A tension spring 20 connecting the free ends of the brake shoe exercises a retractive tension on the yieldable portions of the brake shoe and effects the continuous engagement of the wear plates 19 with the brake cam 17. A friction member 21, comprising a strip of spring metal formed as a split ring $21^a$, and having bands of friction material $21^b$ secured to its inner and outer faces, is interposed between the brake drum 10 and the brake shoe 11. The ring $21^a$ is preferably constructed from a material whose inherent resiliency and normal form will by virtue of being slightly deformed in placement, effect a frictional engagement of the member 21 with one of the opposing braking element faces, and as herein illustrated preferably with the inner face of the brake drum 10; it is also desirable that this ring be capable of being advanced to a position between the brake elements without removing the wheel from the vehicle axle; also it should be capable of withstanding such deformations as it may be subjected to, when sprung over the axle housing and component parts, incident to its assembly with the brake arm. The facing strips or bands 21$^b$, may be of any suitable material to create frictional binding and as shown in Fig. 3, the bands are secured to the inner and outer faces of the ring 21$^a$ by rivets 22. The friction member 21 may be of substantially the same width as the brake shoe 11, and held against lateral displacement by a plate 23 and the web of the brake drum 10.

The ends of the brake shoes are preferably inclined or rounded back at 11$^f$ to prevent the friction member from being restrained or held against rotation when the brake is operated. By virtue of this construction the friction member may creep when a relatively high pressure is applied to the brakes. The areas of the two faces may be varied relative to each other so that both contacting surfaces of the friction material will be subjected to substantially the same average wear; also the frictional heat developed at the contacting surfaces will be dissipated through both the brake shoe and brake drum.

Referring now to the external type brake mechanism which is also an embodiment of my invention shown in Figs. 1 and 2 a distinctive characteristic of this mechanism resides, as in the case of the internal brake, in the employment of a friction member 30, interposed between the brake drum 10 and the brake band 31; as shown this is unattached to either.

The structure of the friction member 30, employed in the external or contracting brake mechanism may be like that described for the internal brake 11, or in either case, as illustrated herein, for the external brake may have no resilient reinforcing ring such as the metal strip 21$^a$. The material chosen for the friction member 30, in such a case illustrated at 30 where a homogeneous member is shown, being in itself of such inherent resiliency as to cause its cleavage to the brake band 31. Bakelite or fibre, or other known friction materials may be used for this purpose. Inwardly depending flanges 31$^a$ on the brake band 31 maintains lateral alignment of the member 30.

During non-braking periods suitable clearance exists between the rotative and fixed brake elements and the friction member is supported in preferably resilient engagement with either the rotatable brake drum or the fixed brake element. The running clearance of the friction member may be established and gauged in any suitable manner, such as usually employed in the type of brakes where the brake lining is secured to the brake shoe, and may vary according to the amount of movement communicated to the cam member such as the member 17 from the operating linkage 40.

Where the friction members 21 and 30 or either of them become worn and it is desired to replace the same the plate 23 may first be removed then with the use of a suitable tool one of the free ends of the friction members may be withdrawn from the space between the brake drum and adjacent brake shoe and twisted over one of the brackets as illustrated in Figure 8. By working the friction member outwardly and at the same time drawing the end of the ring circumferentially about the bracket 16$^a$ the member will be twisted to a position which will afford its release from the opposite bracket and the ring may then be sprung over the axle. Obviously the insertion of a new friction element may be effectuated by the reversal of this operation.

In the appended claims, I sometimes refer to the shaft effecting rotation of the rotatable brake element as a driving shaft, and I do this comprehending within the term "driving shaft" any and all shafts, spindles, or the like, effecting rotation of one of the brake elements. For instance, within the term "driving shaft" will be comprehended spindles, hubs, and the like, through which motion is imparted to the rotatable brake element, since all are equivalent for the purpose of rotating such brake element, within the purview of my invention.

The preceding description discloses certain embodiments of my invention and points out some of the advantages accruing from its use, but these embodiments and advantages have been shown and described merely for purposes explaining my invention whose scope is not limited thereto. As will appear to those skilled in the art the invention is susceptible of embodiment in various forms departing from those disclosed herein, but which are nevertheless comprised within the invention.

I claim:—

1. As an article of manufacture, a removable resilient friction element for a vehicle brake comprising an interrupted formed ring strip having two concentric friction faces.

2. As an article of manufacture, a separable friction wear strip for brakes, a non-metallic friction facing therefor, said strip adapted to be sprung into position by distortion from its normal form between the relatively rotatable elements of a brake and adapted to adhere to one of such elements by the resiliency of the strip itself distorted and in striving to regain its normal unstressed form.

3. As an article of manufacture, a removable friction element for a vehicle brake comprising a formed loop strip having two friction faces, the loop departing from normal form and adapted to be sprung onto a circular brake element to cause it to attain the substantially circular form of the element against the spring power of the friction element and thereafter caused to adhere to the brake element by its continued effort to regain its unstressed form.

4. In a brake mechanism, the combination with a pair of brake elements, one of which is rotatable with respect to the other, having opposing faces, and an interposed floating brake lining of curved form held in engagement with one of the faces by the power of its inherent resiliency after being deformed, attempting to regain its unstressed form.

5. In a braking mechanism, a pair of concentric opposed annular brake elements, one of said elements being a relatively fixed and the other a relatively rotatable element, a friction strip frictionally carried by one of the elements and adapted to be compressed between the elements to simultaneously frictionally engage both elements, one of said elements having a discontinuous braking surface with rounded edges at the terminals thereof.

6. In a vehicle brake mechanism, the combination with a pair of concentric relatively rotatable cylindrical elements one of which is rotated by a vehicular driving shaft, of a removable friction strip having free ends, insertable between and rotatable relative to both said elements, normally out of contact with one of said elements.

7. In a vehicle brake mechanism, the combination with a pair of concentric relatively rotatable cylindrical elements one of which is rotated by a vehicular driving shaft, of a removable friction strip having free ends, insertable between and rotatable relative to both said elements, normally out of contact with one of said elements, and means for advancing one of said elements to compress the strip between the elements.

8. In a vehicle brake mechanism, the combination with a pair of concentric relatively rotatable cylindrical elements one of which is rotated by a vehicular driving shaft, of a removable friction strip having free ends, insertable between and rotatable relative to both said elements, normally out of contact with one of said elements, said strip being held in contact with the other element by spring pressure.

9. In a vehicle brake mechanism, the combination with a pair of concentric relatively rotatable cylindrical elements one of which is rotated by a vehicular driving shaft, of a removable friction strip having free ends, insertable between and rotatable relative to both said elements, normally out of contact with one of said elements, said strip by its inherent resiliency exerting pressure against the other element.

10. In a vehicle brake mechanism, the combination with a pair of concentric relatively rotatable cylindrical elements one of which is rotated by a vehicular driving shaft, of a removable friction strip having free ends, insertable between and rotatable relative to both said elements, normally out of contact with one of said elements, and adhering to the other element.

11. In a vehicle brake mechanism, the combination with a pair of concentric relatively rotatable cylindrical elements one of which is rotated by a vehicular driving shaft, of a removable friction strip having free ends, insertable between and rotatable relative to both said elements, normally out of contact with one of said elements, and adhering to the other element, and aligning means carried by said other element to prevent lateral displacement of the friction strip.

12. In a vehicle brake mechanism, the combination of a pair of relatively rotatable brake elements, a vehicle propulsion mechanism associated therewith, and a semi-rigid ring-shaped strip, insertable and removable over said mechanism into and out of an operative position between said elements.

13. In a brake mechanism, the combination with a pair of brake elements, one of which is rotatable with respect to the other, having regular arcuate opposing faces, and an interposed floating brake lining of curved form held in engagement with one of the faces by the power of its inherent resiliency after being deformed, attempting to regain its unstressed form.

14. In a vehicle brake mechanism, the combination of a pair of relatively rotatable brake elements, an axle assembly associated therewith, and a semi-rigid ring-shaped strip, insertable and removable over said assembly into and out of an operative position between said elements.

15. In a brake mechanism, the combination of a pair of relatively rotatable elements, a driving mechanism associated with one of said elements, and a semi-rigid ring-shaped friction strip insertable and removable over said mechanism into and out of an operative position between said elements.

16. In a brake mechanism, the combination of a pair of relatively rotatable elements, a driving mechanism associated with one of said elements, and a resilient ring-shaped friction strip insertable and removable over said mechanism into and out of an operative position between said elements.

17. In a brake mechanism, the combination of a pair of relatively rotatable elements, a driving mechanism associated with one of said elements and a semi-rigid ring-shaped friction strip insertable and removable over said mechanism into and out of an operative position between said elements, said ring-shaped strip comprising a metallic band faced on two sides with friction material.

18. In a braking mechanism, a pair of relatively rotatable elements having opposed braking surfaces, and a resilient friction member, capable of relative rotation in respect to both of said elements, pressed against the braking surface of one of said elements by distortion from its normal form.

19. In a braking mechanism, a brake drum, an expanding brake associated therewith, said drum and said brake having opposed braking surfaces, and a resilient friction member, capable of relative rotation in respect to both said drum and said brake, pressed against the braking surface of said brake by distortion from its normal form.

In testimony whereof I hereunto affix my signature this 13th day of February, 1925.

ARTHUR H. EDGERTON.